US012602391B2

(12) United States Patent
Bi et al.

(10) Patent No.: US 12,602,391 B2
(45) Date of Patent: Apr. 14, 2026

(54) LABEL ARCHITECTURE BUILDING SYSTEM AND LABEL ARCHITECTURE BUILDING METHOD

(71) Applicants: DIGIWIN CO., LTD., Shanghai (CN); DATA SYSTEMS CO., LTD., New Taipei City (TW)

(72) Inventors: Wenliang Bi, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 0 days.

(21) Appl. No.: 18/359,918

(22) Filed: Jul. 27, 2023

(65) Prior Publication Data
US 2024/0427781 A1     Dec. 26, 2024

(30) Foreign Application Priority Data
Jun. 20, 2023     (CN) .......................... 202310735822.3

(51) Int. Cl.
*G06F 16/2458*     (2019.01)
*H04L 67/30*     (2022.01)

(52) U.S. Cl.
CPC .......... *G06F 16/2465* (2019.01); *H04L 67/30* (2013.01)

(58) Field of Classification Search
CPC ... G06F 16/2465; G06F 16/1465; H04L 67/30
USPC ....................................................... 707/776
See application file for complete search history.

(56) References Cited

U.S. PATENT DOCUMENTS

| | | | | |
|---|---|---|---|---|
| 7,885,844 B1 * | 2/2011 | Cohen | ................... | G06Q 10/10 |
| 9,471,887 B2 * | 10/2016 | Shin | ....................... | G06N 20/00 |
| 10,999,325 B1 * | 5/2021 | Chandana | ............. | H04L 67/535 |
| 11,392,195 B2 * | 7/2022 | Spinelli | ................. | G06N 20/00 |

(Continued)

FOREIGN PATENT DOCUMENTS

| | | | | |
|---|---|---|---|---|
| CN | 109918583 A | * | 6/2019 | |
| CN | 111144699 A | * | 5/2020 | |

(Continued)

OTHER PUBLICATIONS

Tibely et al., "Extracting Tag Hierarchies", PLoS ONE, vol. 8, Issue 12, e84133, Dec. 2013, pp. 1-12. (Year: 2013).*

*Primary Examiner* — Phuong Thao Cao
(74) *Attorney, Agent, or Firm* — JCIPRNET

(57) ABSTRACT

A label architecture building system and a label architecture building method are provided. The label architecture building system includes a storage device and a processor. The processor executes a plurality of modules in the storage device. A task profile label building module performs data mining according to task and user information in an enterprise system to generate task label data and builds a task profile label architecture according to the task label data. A user profile label building module performs data mining according to user information in the enterprise system to generate user label data and builds a user profile label architecture according to the user label data, so that a recommendation system provides recommendation information according to input information, the task profile label architecture, and the user profile label architecture. The efficiency of building the label architecture and the accuracy of the profile are accordingly improved.

16 Claims, 3 Drawing Sheets

(56) References Cited

U.S. PATENT DOCUMENTS

| | | | | |
|---|---|---|---|---|
| 11,521,714 | B1 * | 12/2022 | Jain | G16H 10/60 |
| 2004/0017400 | A1 * | 1/2004 | Ly | G06Q 10/06 |
| | | | | 715/810 |
| 2006/0106675 | A1 * | 5/2006 | Cohen | G06Q 30/0601 |
| | | | | 705/37 |
| 2009/0012970 | A1 * | 1/2009 | Ziv | G06F 16/35 |
| 2009/0192872 | A1 * | 7/2009 | Moritz | G06Q 30/00 |
| | | | | 705/35 |
| 2009/0248510 | A1 * | 10/2009 | Ahluwalia | G06F 16/3322 |
| | | | | 707/999.005 |
| 2010/0174578 | A1 * | 7/2010 | Duffy | G06Q 10/063112 |
| | | | | 705/7.17 |
| 2011/0154216 | A1 * | 6/2011 | Aritsuka | G06F 9/44505 |
| | | | | 715/745 |
| 2011/0207099 | A1 * | 8/2011 | Chen | A61B 5/7264 |
| | | | | 434/236 |
| 2012/0303561 | A1 * | 11/2012 | Sathish | G06N 3/004 |
| | | | | 706/14 |
| 2013/0132481 | A1 * | 5/2013 | Lee | G06Q 50/01 |
| | | | | 709/204 |
| 2016/0224939 | A1 * | 8/2016 | Chen | G06Q 10/06311 |
| 2016/0378757 | A1 * | 12/2016 | Bahl | G06Q 50/01 |
| | | | | 707/728 |
| 2016/0379268 | A1 * | 12/2016 | Song | G06Q 30/0269 |
| | | | | 705/14.53 |
| 2017/0004455 | A1 * | 1/2017 | Tang | G06Q 10/1053 |
| 2019/0065612 | A1 * | 2/2019 | Kenthapadi | G06Q 10/1053 |
| 2019/0066054 | A1 * | 2/2019 | Kenthapadi | G06Q 10/063112 |
| 2019/0122260 | A1 * | 4/2019 | He | G06Q 30/0269 |
| 2019/0163533 | A1 * | 5/2019 | Andrews | G06F 9/5066 |
| 2019/0205872 | A1 * | 7/2019 | Tourne | G06F 16/285 |
| 2019/0364009 | A1 * | 11/2019 | Joseph | G06F 16/2358 |
| 2020/0293975 | A1 * | 9/2020 | Faulkner | G06Q 10/107 |
| 2021/0097188 | A1 * | 4/2021 | Findlay | G06F 16/288 |
| 2021/0117569 | A1 * | 4/2021 | Li | G06F 21/1078 |
| 2021/0264321 | A1 * | 8/2021 | Xiang | G06N 20/20 |
| 2021/0342194 | A1 * | 11/2021 | Zhang | G06F 9/5038 |
| 2021/0342527 | A1 * | 11/2021 | Kapcar | G06F 40/186 |
| 2021/0383306 | A1 * | 12/2021 | Somashekairah | G06N 3/08 |
| 2022/0027561 | A1 * | 1/2022 | Ganesan | G06N 3/045 |
| 2023/0205915 | A1 * | 6/2023 | Wang | G06N 20/00 |
| | | | | 726/26 |
| 2023/0224540 | A1 * | 7/2023 | Kodali | G06Q 40/03 |
| | | | | 725/34 |
| 2023/0334249 | A1 * | 10/2023 | Kumar | G06N 5/022 |
| 2024/0394629 | A1 * | 11/2024 | Bi | G06Q 10/06316 |

FOREIGN PATENT DOCUMENTS

| | | | | | |
|---|---|---|---|---|---|
| CN | 112507204 | A | * | 3/2021 | G06F 16/9535 |
| CN | 113806638 | A | * | 12/2021 | G06F 16/906 |
| CN | 114446431 | A | * | 5/2022 | |
| CN | 115545771 | A | * | 12/2022 | G06Q 30/0255 |
| CN | 115665491 | A | * | 1/2023 | |
| KR | 20200052798 | A | * | 5/2020 | |
| WO | WO-2021213156 | A1 | * | 10/2021 | G06F 16/9024 |

* cited by examiner

Executing data mining to generate task label data according to task and user information — S210

Building a task profile label architecture according to the task label data — S220

Executing data mining to generate user label data according to user information — S230

Building a user profile label architecture according to the user label data — S240

LABEL ARCHITECTURE BUILDING SYSTEM AND LABEL ARCHITECTURE BUILDING METHOD

CROSS-REFERENCE TO RELATED APPLICATION

This application claims the priority benefit of China application serial no. 202310735822.3, filed on Jun. 20, 2023. The entirety of the above-mentioned patent application is hereby incorporated by reference herein and made a part of this specification.

BACKGROUND

Technical Field

The disclosure relates to an electronic system, and in particular, relates to a label architecture building system and a label architecture building method.

Description of Related Art

Through the enterprise service platform, enterprises can provide various business services to meet customers' needs. By building a customer-oriented profile, the enterprise service platform can understand customers' needs, behaviors and habits more deeply, so that improved services are provided. However, the manufacturing industry has a wide range of customer types, and the customers' needs are diverse. As such, effective profiles cannot be built through the currently-available profile building methods, and the services provided by the enterprise service platform fail to meet customers' needs as a result.

SUMMARY

The disclosure relates to a label architecture building system applied to the manufacturing industry and capable of building a complete label architecture to improve the efficiency of building the label architecture and the accuracy of profiles.

According to an embodiment of the disclosure, the disclosure provides a label architecture building system including a storage device and a processor. The storage device is coupled to an enterprise system and a recommendation system. The storage device stores a plurality of modules. The processor is coupled to the storage device. The processor executes the plurality of modules. The plurality of modules include a task profile label building module and a user profile label building module. The task profile label building module performs data mining according to task and user information in the enterprise system to generate task label data. The task profile label building module builds a task profile label architecture according to the task label data. The user profile label building module performs data mining according to user information in the enterprise system to generate user label data. The user profile label building module builds a user profile label architecture according to the user label data, so that the recommendation system provides recommendation information according to input information, the task profile label architecture, and the user profile label architecture.

According to an embodiment of the disclosure, the disclosure further provides a label architecture building method including the following steps. The storage device stores a plurality of modules. The storage device is coupled to an enterprise system and a recommendation system. The processor executes the plurality of modules. The plurality of modules include a task profile label building module and a user profile label building module. The step of executing the plurality of modules includes the following steps. The task profile label building module performs data mining according to task and user information in the enterprise system to generate task label data. The task profile label building module builds a task profile label architecture according to the task label data. The user profile label building module performs data mining according to user information in the enterprise system to generate user label data. The user profile label building module builds a user profile label architecture according to the user label data, so that the recommendation system provides recommendation information according to input information, the task profile label architecture, and the user profile label architecture.

To sum up, in the label architecture building system and the label architecture building method provided by the disclosure, by building the corresponding profile label architecture through the task profile label building module according to the task and user information and building the corresponding profile label architecture through the user profile label building module according to the user information, the efficiency of building the label architecture and the accuracy of profiles are improved. Therefore, the label architecture building system is able to adapt to the special needs of the manufacturing industry to build a complete profile label architecture, so that the recommendation system using this profile label architecture is able to provide accurate recommendation information.

To make the aforementioned more comprehensible, several embodiments accompanied with drawings are described in detail as follows.

DESCRIPTION OF THE EMBODIMENTS

Figure 1:
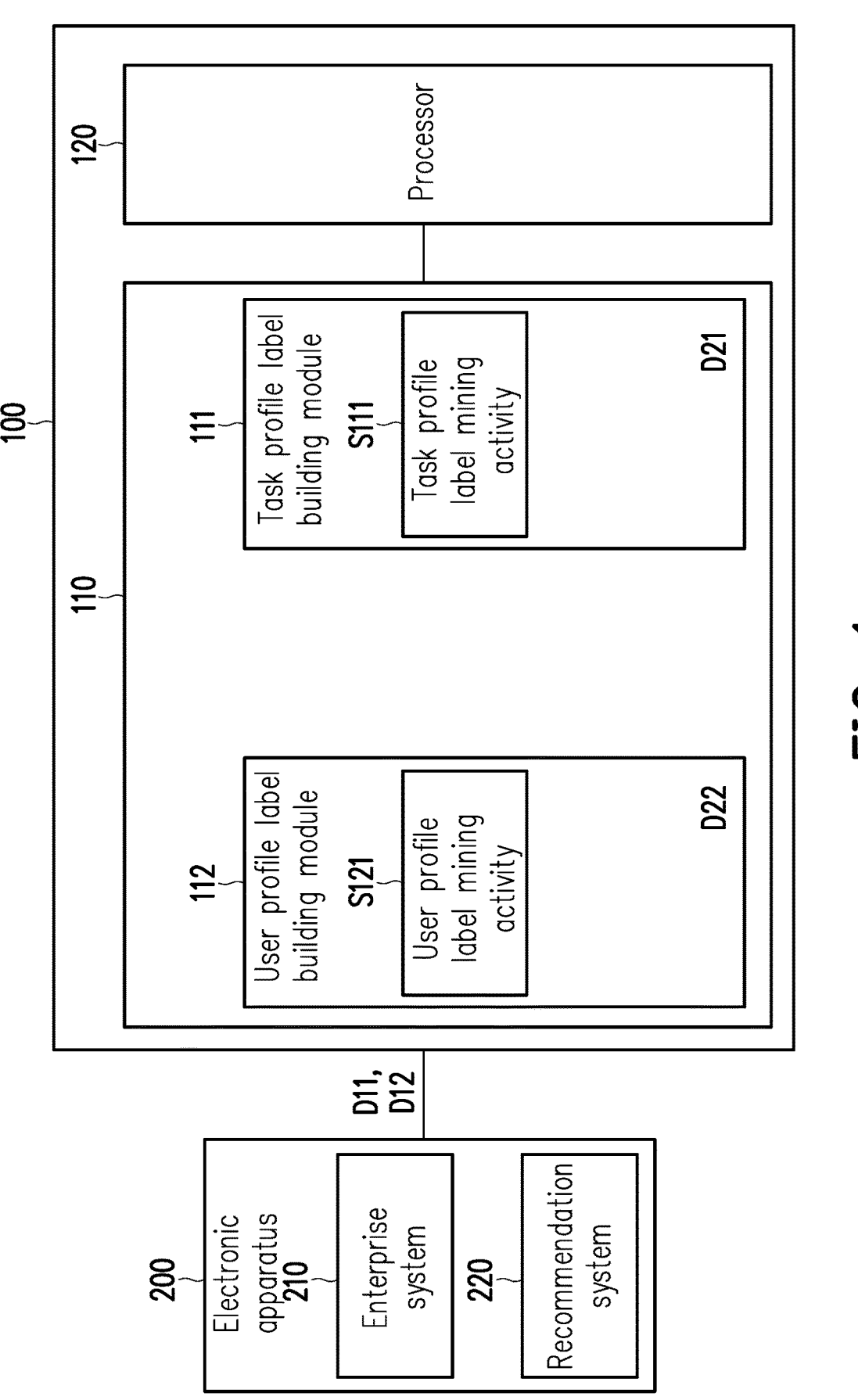
FIG. 1 is a circuit block diagram of a label architecture building system according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

FIG. 1 is a circuit block diagram of a label architecture building system according to an embodiment of the disclosure. With reference to FIG. 1, a label architecture building system 100 is applied to data mining to respectively construct a user-oriented label architecture D22 and a task-oriented label architecture D21 according to various information D11 and D12 in an enterprise system 210. In this embodiment, the label architecture building system 100 may be applied to the manufacturing industry, so that a recommendation system 220 may provide recommendation information based on the built label architectures D21 and D22.

In this embodiment, the enterprise system 210 is coupled to an electronic apparatus 200. The electronic apparatus 200 may operate a user interface to execute the enterprise system

210 through an application programming interface (API) and then execute various business services through the enterprise system 210. For instance, the electronic apparatus 200 may call the enterprise system 210 through the API, so as to perform various functions (such as approving a purchase order) in a manufacturing scenario application.

In this embodiment, the recommendation system 220 is coupled to the electronic apparatus 200. The electronic apparatus 200 may operate the user interface to execute the recommendation system 220 through the API and then obtain the result of the API calling through the recommendation system 220. For instance, the electronic apparatus 200 may call the recommendation system 220 through the API to obtain recommendation information generated based on the multiple label architectures D21 and D22 in the manufacturing scenario application.

In this embodiment, the electronic apparatus 200 may be, for example, a mobile phone, a tablet computer, a notebook computer, a desktop computer, and the like. The enterprise system 210 may be, for example, an enterprise resource planning (ERP) system. The recommendation system 220 may be, for example, an intelligent recommendation system applied in manufacturing.

In this embodiment, the label architecture building system 100 is coupled to the electronic apparatus 200. The label architecture building system 100 may be set up on the cloud for a user to execute the label architecture building system 100 by connecting with the electronic apparatus 200. The label architecture building system 100 may be, for example, a software as a service (SaaS) server, so as to execute a corresponding SaaS application through the API. In some embodiments, the label architecture building system 100 may be set up on the premise, so that the user may connect the label architecture building system 100 with other systems set up on the cloud through the electronic apparatus 200 to input/output data and to accordingly execute the corresponding SaaS application through the API.

In this embodiment, the label architecture building system 100 may include a storage device 110 and a processor 120. The storage device 110 is coupled to the enterprise system 210 and the recommendation system 220. The storage device 110 may store a plurality of modules 111 to 112. These modules may include a task profile label building module 111 and a user profile label building module 112. In this embodiment, the storage device 110 may access an enterprise database of the enterprise system 210 (the ERP system 210 is used as an example in the following embodiments for illustration). The enterprise database may store task and user information D11 and user information D12.

Figure 3:
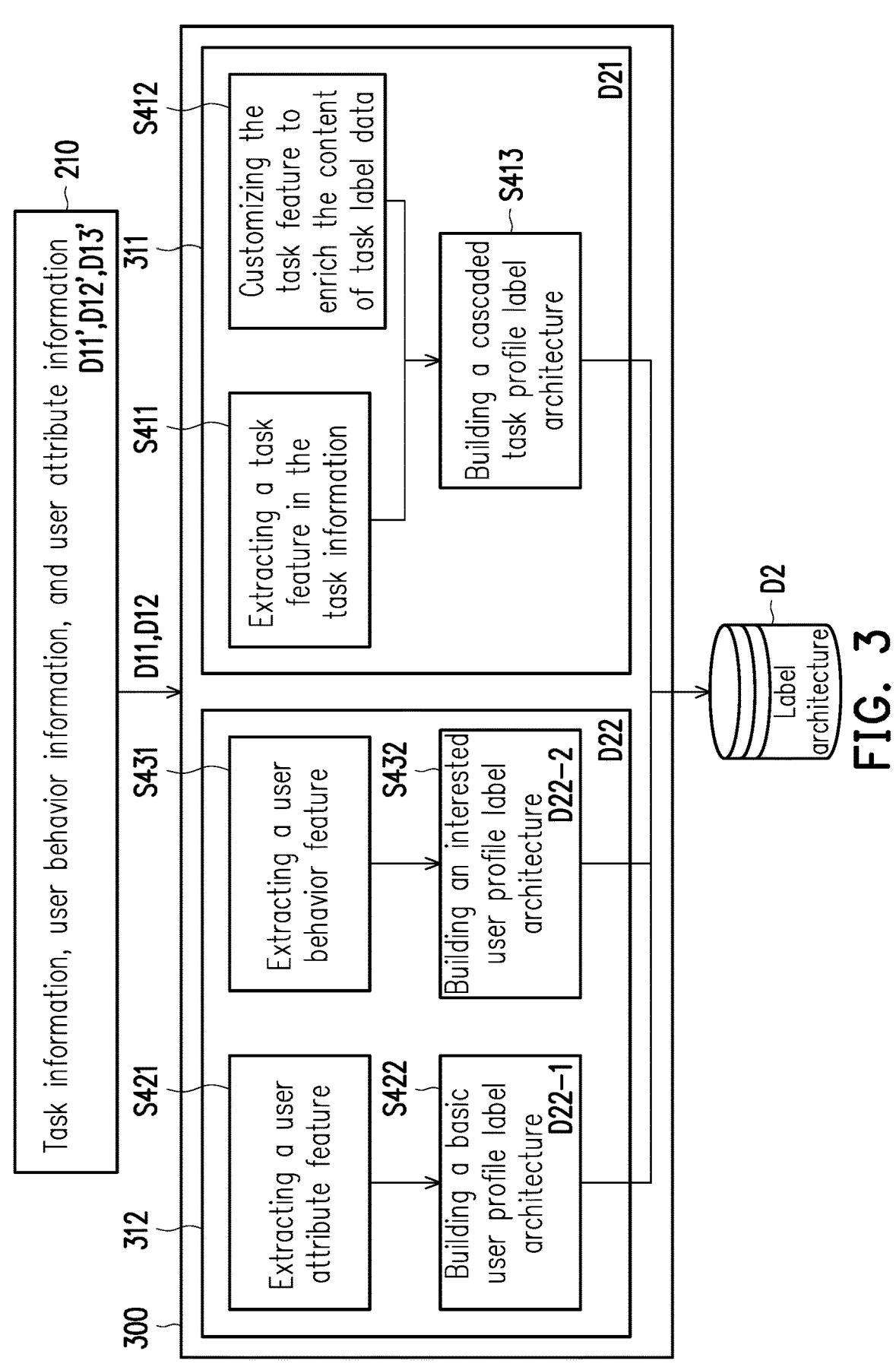
FIG. 3 is a schematic diagram of an operation performed by a label architecture building system according to another embodiment of the disclosure.

In this embodiment, the task and user information D11 may include task information (e.g., information D11' shown in FIG. 3) and user behavior information (e.g., information D12' shown in FIG. 3). That is, the task and user information D11 may indicate information related to tasks such as various business behaviors (or business functions) and information related user operation tasks.

In this embodiment, the user information D12 may include user behavior information (e.g., information D12' shown in FIG. 3), and user attribute information (e.g., information D13' shown in FIG. 3). That is, the user information D12 may indicate information related to user operation tasks and information related to user attributes such as any tenant or any user under a specific tenant.

In this embodiment, the storage device 110 may also store related algorithms, computing software, etc. of the modules 111 to 112, which are used to implement related algorithms, programs, and data for functions such as data mining, data labeling, data classification, various calculations, model training, etc. in the disclosure. The storage device 110 may be, for example, a dynamic random access memory (DRAM), a flash memory, a non-volatile random access memory (NVRAM), or a combination of the foregoing.

In this embodiment, the processor 120 is coupled to the storage device 110. The processor 120 may access the storage device 110, may execute data and the various modules 111 to 112 in the storage device 110, and may access data (e.g., information D11 and D12) from the ERP system 210 through the electronic apparatus 200. In this embodiment, the processor 120 may be, for example, a signal converter, a field programmable gate array (FPGA), a central processing unit (CPU), a programmable microprocessor for general or special use, a digital signal processor (DSP), a programmable controller, an application specific integrated circuit (ASIC), a programmable logic device (PLD), other similar devices, or a combination of these devices, and the processor 120 may load and execute computer program-related firmware or software to implement functions such as data mining, data labeling, data classification, various calculations, and model training and execution.

Figure 2:
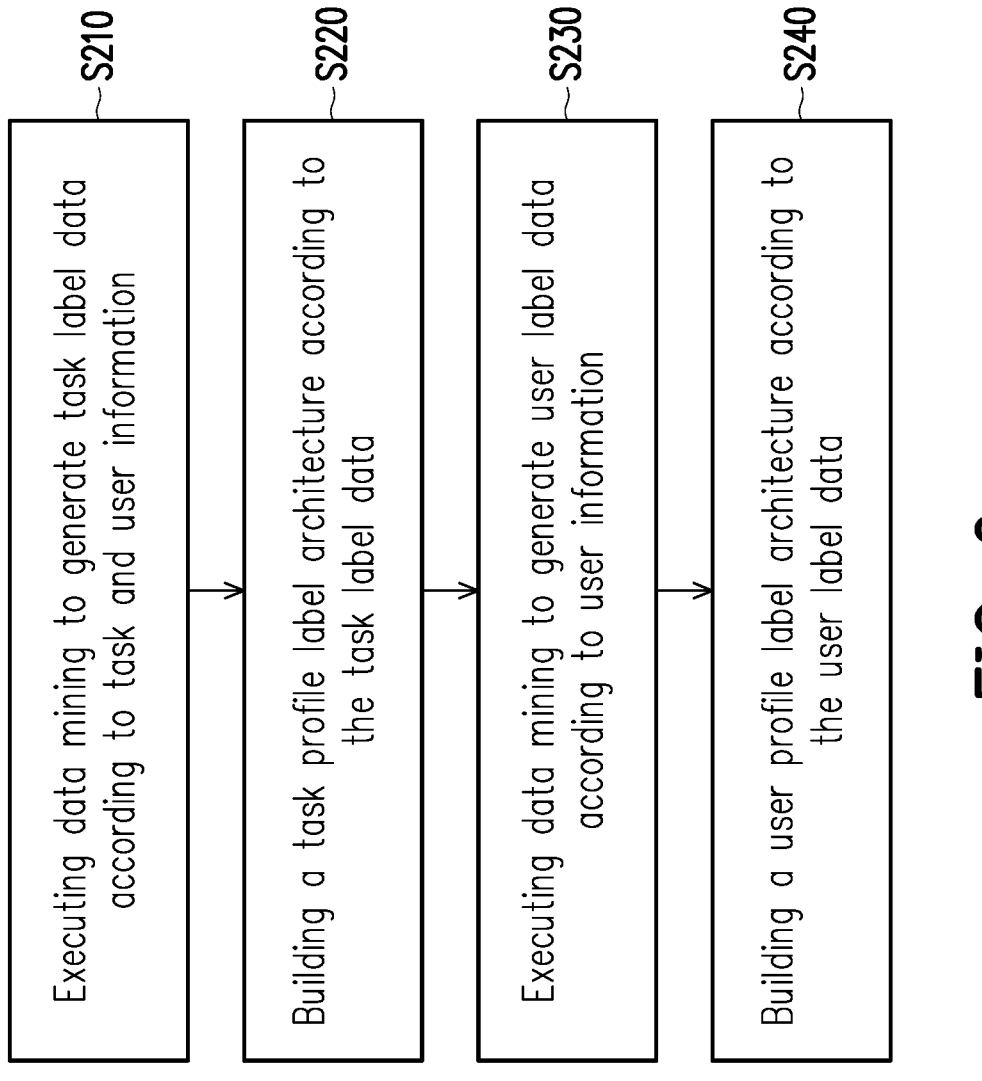
FIG. 2 is a flow chart of a label architecture building method according to an embodiment of the disclosure.

FIG. 2 is a flow chart of a label architecture building method according to an embodiment of the disclosure. With reference to FIG. 1 and FIG. 2, the label architecture building system 100 may execute the following steps S210 to S240. The order of these steps S210 to S240 is only for illustration and not limited thereto. In this embodiment, steps S210 to S240 may be applied to the following exemplary situations.

In this embodiment, the processor 120 executes the task profile label building module 111, so that the task profile label building module 111 executes a module S111 to build the task profile label architecture D21. In the module S111, the task profile label building module 111 performs a task profile label mining activity according to a task and user information D11 to generate a collection (i.e., the task profile label architecture D21) of various task labels related to the task.

To be specific, in step S210, the processor 120 executes the task profile label building module 111, so that the task profile label building module 111 executes data mining to generate task label data according to the task and user information D11 in the ERP system 210. In this embodiment, the task label data may be, for example, feature data related to a plurality of tasks in the ERP system 210. The task label data may be represented by, for example, a task profile.

In step S220, the processor 120 executes the task profile label building module 111, so that the task profile label building module 111 builds the task profile label architecture D21 according to the task label data. That is, the task profile label building module 111 mines (e.g., extracts, enriches, and associates) the task and user information D11 to obtain a plurality of task features (i.e., task label data). The task profile label building module 111 collects and builds the mined task label data into a label architecture related to the task profile and outputs the label architecture as the task profile label architecture D21.

In this embodiment, the task profile label building module 111 stores the task profile label architecture D21 in a first database. The first database may be, for example, the storage device 110, or a database externally connected to the label architecture building system 100 and the recommendation system 220. The recommendation system 220 accesses the first database to operate according to the task profile label architecture D21.

In this embodiment, the processor 120 executes the user profile label building module 112, so that the user profile label building module 112 executes a module S121 to build the user profile label architecture D22. In the module S121, the user profile label building module 112 performs a user profile label mining activity according to the user information D12 to generate a collection (i.e., the user profile label architecture D21) of various user labels related to a user.

To be specific, in step S230, the processor 120 executes the user profile label building module 112, so that the user profile label building module 112 executes data mining to generate user label data according to the user information D12 in the ERP system 210. In this embodiment, the user label data may be, for example, feature data related to a plurality of users in the ERP system 210. The user label data may be represented by, for example, a user profile.

In step S240, the processor 120 executes the user profile label building module 112, so that the user profile label building module 112 builds the user profile label architecture D21 according to the user label data. That is, the user profile label building module 112 mines (e.g., extracts and enriches) the user information D12 to obtain a plurality of user features (i.e., user label data). The user profile label building module 112 collects and builds the mined user label data into a label architecture related to the user profile and outputs the label architecture as the user profile label architecture D22.

In this embodiment, the user profile label building module 112 stores the user profile label architecture D22 in a second database. The second database may be, for example, the storage device 110, or a database externally connected to the label architecture building system 100 and the recommendation system 220. The recommendation system 220 accesses the second database to operate according to the user profile label architecture D22.

After the task profile label architecture D21 and the user profile label architecture D22 are completed, the recommendation system 220 generates recommendation information according to these label architectures D21 and D22. In this embodiment, the recommendation system 220 executes data drive according to input information, the task profile label architecture D21, and the user profile label architecture D22 to generate the recommendation information and provides the recommendation information to the ERP system 210 or the recommendation system 220. The user accesses the recommendation information through the electronic apparatus 200.

In this embodiment, the input information may be, for example, information expressed as "tenant ID and user ID" to indicate a specific user under a specific tenant operating the electronic apparatus 200 in the ERP system 210. The recommendation system 220 executes a recommendation engine module (not shown), so that the recommendation engine module generates a user profile expressed as "accountant" as well as task profiles expressed as "cashier" and "approval" according to the input information, the task profile label architecture D21, and user profile label architecture D22, and accordingly generates the recommendation information. The recommendation information may be, for example, information expressed as "output task list" and includes recommendation tasks that are sorted or that are not sorted. In some embodiments, the input information may be replaced by the information expressed as "output task list", so that the recommendation system 220 provides recommendation information expressed as "tenant ID and user ID".

In this embodiment, the recommendation engine module in the recommendation system 220 may be implemented by software or firmware, for example. To be specific, the recommendation engine module may include a representational state transfer (REST) API, a software development kit (SDK), or a combination of the foregoing to call the task profile label architecture D21 and the user profile label architecture D22. The recommendation engine module may also include a Neo4j database to store the accessed data.

It is worth mentioning herein that by performing data mining through the modules 111 to 112 to build the task profile label architecture D21 and the user profile label architecture D22, the efficiency of building the label architectures D21 and D22 may be improved, and the accuracy of the corresponding task profiles and user profiles in the label architectures D21 and D22 may also be enhanced. Therefore, the label architecture building system 100 can build complete label architectures D21 and D22 and thus may be applied to the manufacturing industry having various needs. In this way, based on the label architecture building system 100, the recommendation system 220 may apply these label architectures D21 to D22 to provide accurate recommendation information.

FIG. 3 is a schematic diagram of an operation performed by a label architecture building system according to another embodiment of the disclosure. With reference to FIG. 3, a label architecture building system 300 is coupled to the ERP system 210. The label architecture building system 300 may include a task profile label building module 311 and a user profile label building module 312 stored in a storage device and a processor for executing these modules 311 to 312. The description of the label architecture building system 300, the task profile label building module 311, and the user profile label building module 312 may be obtained by referring to the relevant description of the label architecture building system 100 and may also be deduced by analogy.

In this embodiment, the ERP system 210 includes task information D11', user behavior information D12', and user attribute information D13'. In this embodiment, the label architecture building system 300 accesses the task information D11' and the user behavior information D12' in the ERP system 210 to act as the task and user information D11. The label architecture building system 300 accesses the user behavior information D12' and the user attribute information D13' in the ERP system 210 to act as the user information D12.

In this embodiment, the task profile label building module 311 may be implemented by using a machine learning model, for example. To be specific, the task profile label building module 311 may include one or a plurality of classification models and one or a plurality of association analysis models. The classification model may be, for example, a one-hot model, a Word2vec model, an xgboost model, or a combination of the foregoing, so as to perform functions such as extraction and analysis related to the task profile label building module 311 in this embodiment. The association analysis models may be, for example, an Apriori model, so as to perform the association analysis function of the task profile label building module 311 in this embodiment.

In this embodiment, the user profile label building module 312 may be implemented by using a machine learning model, for example. To be specific, the user profile label building module 312 may include one or a plurality of classification models. The classification model may be, for example, a Word2vec model, an xgboost model, or a combination of the foregoing, so as to perform various functions related to the user profile label building module 312 in this embodiment.

In this embodiment, the task profile label building module 311 implements the task profile label architecture D21 of a building target by executing the modules S411 to S413. The operation details of steps S210 to S220 and the module S111 are described with examples.

To be specific, the task profile label building module 311 executes the module S411, so that the task profile label building module 311 performs data extraction according to the task information D11' in the task and user information D11 to generate first task feature data associated with a plurality of first features of the task information D11'. The first task feature data is included in the task label data shown in steps S210 to S220. That is, in the module S411, the task profile label building module 311 extracts a task feature in the task information D11' to obtain the first task feature data (i.e., part of the task label data), so as to use the first task feature data as a task-oriented label.

In this embodiment, the data extraction in the module S411 may be, for example, log mining, so as to be applied to unsupervised learning and calculation of natural language processing (NLP). The step of data extraction may include, for example, automatically classifying and sorting out logfiles in the task information D11' and accordingly outputting the first task feature data.

In this embodiment, the task information D11' (also referred to as task metadata) may be, for example, the basic information of the task. The task information D11' includes information such as a task name, a task type, and task description. The first task feature data may be, for example, task features extracted from the task information D11' according to the actual needs in the manufacturing scenario. The first task feature data includes task features such as key indicators of the task, execution steps, equipment requirements, and material requirements. For instance, the task information D11' may include, for example, a task name expressed as "production plan management", a task type expressed as "production task", and task description expressed as "responsible for making a production plan" and "information such as time, output, equipment, and materials of the production plan". The first task feature data may include, for example, task features expressed as "production index", "equipment requirement", and "material requirement".

Continuing with the above, the task profile label building module 311 executes the module S412, so that the task profile label building module 311 analyzes the task information D11' according to the user behavior information D12' in the task and user information D11 to generate second task feature data associated with a plurality of second features of the task information D11'. The second task feature data is included in the task label data shown in steps S210 to S220. That is, in the module S412, the task profile label building module 311 customizes the task feature in the task information D11' to obtain the second task feature data (i.e., part of the added task label data), so as to enrich the content of the task label data and use the second task feature data as a task-oriented label.

In this embodiment, the analysis operation in the module S412 may be, for example, calculation applying unsupervised learning. The analysis operation may include, for example, automatically analyzing, classifying, and sorting out the task information D11' applied to various scenarios according to the user behavior information D12' and accordingly outputting the second task feature data.

In this embodiment, the user behavior information D12' is stored in a user behavior collection module in the ERP system 210. The user behavior information D12' (also referred to as user behavior data) may be, for example, a logfile, transaction data, data trace, a microservice log, or a combination of the foregoing of any user or task. The second task feature may be, for example, the task feature extracted from the task information D11' according to a historical behavior of the user operating the task (i.e., behavior information D12'). The second task feature includes task features such as operating frequency with a specific task type, equipment requirements and/or material requirements with specific process requirements, and the like.

For instance, the task information D11' may be a specific type of task expressed as "production task". For the task information D11', the second task feature data may include, for example, task features expressed as "high-frequency task", "complex task", and "emergency task". For another example, assuming that the user behavior information D12' indicates that this task type has to be completed within the first 5 days of each month most of the time and requires the use of specific types of equipment and specific types of raw materials, so for the task information D11', the second task feature data may include, for example, task features expressed as "emergency task", "specific equipment task", and "specific material task".

Next, the task profile label building module 311 executes the module S413, so that the task profile label building module 311 performs association analysis according to the first task feature data extracted from the module S411 and the second task feature data extracted from the module S412 to build the task profile label architecture D21. That is, in the module S413, the task profile label building module 311 classifies and organizes the extracted first task feature data and the extracted second task feature data (i.e., task label data), so as to build the task label data into a cascaded task profile label architecture D21.

In this embodiment, the association analysis in the module S413 may be, for example, calculation applying unsupervised learning. The step of association analysis may include, for example, automatically classifying the first task feature data and the second task feature data (i.e., task label data) into a plurality of different categories, automatically subdividing each classified category into a plurality of different subcategories, and accordingly building these category data into a label architecture to be outputted as the task profile label architecture D21.

For instance, in the process of performing the association analysis, the task label data may be classified into a plurality of categories such as "production task", "maintenance task", and "inspection task". Taking the category represented as "production task" as an example, in the process of performing the association analysis, this category may be further classified into a plurality of subcategories such as "emergency production task", "mass production task", and "customized production task".

It should be noted that the task profile label building module 311 extracts the task feature from the task information D11' and analyzes the task information D11' in various manufacturing scenarios according to the historical behavior of the user operating the ERP system 210 in practice (i.e., user behavior information D12') to extract more task features. Therefore, the task profile label building module 311 may accurately describe the task information D11' and accordingly obtain rich and detailed task label data. Further, by cascading the first task feature data and the second task feature data through the task profile label building module 311, the features of various task types and corresponding needs may be described more accurately.

After the task profile label architecture D21 is built, the task profile label building module 311 automatically and regularly maintains the task profile label architecture D21. To be specific, the task profile label building module 311 periodically accesses the task information D11' and the user behavior information D12' (i.e., task and user information D11) in the ERP system 210 and re-executes the modules S411 to S413 according to the accessed information D11. Therefore, by updating the task profile label architecture D21 according to the latest task and user information D11 through the task profile label building module 311, adaptation to the ever-changing manufacturing scenarios may be achieved, so the real-time performance and accuracy of the task profile label architecture D21 are accordingly ensured.

For instance, in the process of updating the task profile label architecture D21, according to the latest task information D11', the task profile label building module 311 not only extracts the original task type expressed as "production task", but also extracts updated task types expressed as "automated production task" and "high-risk task".

In this embodiment, the user profile label architecture D22 includes a basic user profile label architecture D22-1 related to the user attribute and an interested user profile label architecture D22-2 related to the user behavior. These label architectures D22-1 to D22-2 may be integrated into a single user profile label architecture D22.

In this embodiment, the user profile label building module 312 implements the basic user profile label architecture D22-1 in the user profile label architecture D22 of the building target by executing the modules S421 to S422 and implements the interested user profile label architecture D22-2 in the user profile label architecture D22 of the building target by executing the modules S431 to S432. The operation details of steps S230 to S240 and the module S121 are described with examples.

To be specific, the user profile label building module 312 executes the module S421, so that the user profile label building module 312 performs data extraction according to the user attribute information D13' in the user information D12 to generate first user feature data associated with a plurality of first features of the user attribute information D13'. The first user feature data is included in the user label data shown in steps S230 to S240. That is, in the module S421, the user profile label building module 312 extracts a user attribute feature in the user attribute information D13' to obtain the first user feature data (i.e., part of the user label data), so as to use the first user feature data as a user-oriented label. In this embodiment, the description of data extraction in the module S421 may be obtained by referring to the description of data extraction in the module S411 and may also be deduced by analogy.

In this embodiment, the user attribute information D13' (also referred to as user attribute data) is stored in a user attribute database in the ERP system 210. In this embodiment, the user attribute information D13' may be, for example, the basic information registered or modified by the user when operating the ERP system 210. The user attribute information D13' may be, for example, basic information on user attributes. The basic information of the user may be, for example, the basic information related to the identity of any tenant, such as the account name, company category, and company account number, the basic information related to the identity of any user under a specific tenant, such as the company, department, function, and superior supervisor, or the basic information of the combination of the foregoing. The first user feature data includes user features related to the user attribute. For instance, the first user feature data may include, for example, user features expressed as "user name", "position", "working department", "working years", "nature of work", and the like.

Continuing with the above description, the user profile label building module 312 executes module S422, so that the user profile label building module 312 analyzes the first user feature data extracted from module S421 to extract and generate second user feature data associated with a plurality of second features of the user attribute information D13'. The second user feature data is included in the user label data shown in steps S230 to S240. That is, the user profile label building module 312 further classifies the first user feature data related to user attribute to obtain the second user feature data (i.e., part of the added user label data), so as to design the content of user label data and use the second user feature data as a user-oriented label.

Further, the user profile label building module 312 executes the module S422, so that the user profile label building module 312 builds a label architecture related to the user profile according to the first user feature data extracted from the module S421 and the second user feature data extracted from the module S422, so as to be outputted to act as the basic user profile label architecture D22-1.

That is, in the module S422, the user profile label building module 312 designs a user feature in the user attribute information D13' to obtain the second user feature data (i.e., part of the added user label data) and builds the first user feature data and the second user feature data related to the user attribute into the basic user profile label architecture D22-1 related to the user attribute. In this embodiment, the description of extraction operation in the module S422 may be obtained by referring to the description of analysis operation in the module S412 and may also be deduced by analogy.

For instance, in the process of executing the module S422, part of the user label data (e.g., the first user feature data) may be classified into a plurality of categories such as "management personnel", "technical personnel", and "operator". Taking the category expressed as "management personnel" as an example, in the process of executing the module S422, this category may be further classified into multiple subcategories such as "junior management personnel", "senior management personnel", and "director-level management personnel" to act as the user label data (e.g., second user feature data) for other parts.

It should be noted that the user profile label building module 312 extracts a user feature from the user attribute information D13' and further extracts (or designs) more user features from the extracted user feature. Therefore, the user profile label building module 312 may accurately describe the user attribute information D11' and accordingly obtain rich and detailed user label data. Therefore, the built basic user profile label architecture D22-1 may describe the features of various user attributes and the corresponding needs more accurately.

On the other hand, the user profile label building module 312 executes the module S431, so that the user profile label building module 312 performs data extraction according to the user behavior information D12' in the user information D12 to generate third user feature data associated with a plurality of first features of the user behavior information D12'. The third user feature data is included in the user label data shown in steps S230 to S240. That is, in the module S431, the user profile label building module 312 extracts a user behavior feature in the user behavior information D12' to obtain the third user feature data (i.e., part of the user label data), so as to use the third user feature data as a user-oriented label. In this embodiment, the description of data extraction in the module S431 may be obtained by referring to the description of data extraction in the module S411 and may also be deduced by analogy.

In this embodiment, the third user feature data includes user features related to the user behavior. For instance, the third user feature data may include, for example, user features expressed as "login time of user", "browsing record", "search keyword", and "operation record", and the like.

Continuing with the above description, the user profile label building module 312 executes the module S432, so that the user profile label building module 312 analyzes the user behavior information D12' to extract and generate fourth user feature data associated with a plurality of second features of the user behavior information D12'. The fourth user feature data is included in the user label data shown in steps S230 to S240. That is, the user profile label building module 312 customizes the user feature in the user behavior information D12' to obtain the fourth user feature data (i.e., part of the added user label data), so as to enrich the content of user label data and use the fourth user feature data as a user-oriented label.

Further, the user profile label building module 312 executes the module S432, so that the user profile label building module 312 builds another label architecture related to the user profile according to the third user feature data extracted from the module S431 and the fourth user feature data extracted from the module S432, so as to be outputted to act as the interested user profile label architecture D22-2.

That is, in the module S432, the user profile label building module 312 customizes the user features related to the user behavior to obtain the fourth user feature data (i.e., part of the added user label data) and builds the third user feature data and the fourth user feature data related to the user behavior into the interested user profile label architecture D22-2 related to the user behavior. In this embodiment, the description of extraction operation in the module S432 may be obtained by referring to the description of analysis operation in the module S412 and may also be deduced by analogy.

For instance, in the process of executing the module S432, the user behavior information D12' may be, for example, a specific type of user feature expressed as "management personnel". Regarding this user behavior information D12', the fourth user feature data may include, for example, user features expressed as "decision maker", "strategic planner", and "cost controller". For another example, the user behavior information D12' may be, for example, a specific type of user feature expressed as "technical personnel". Regarding this user behavior information D12', the fourth user feature data may include, for example, user features expressed as "expert", "process improver", and "troubleshooter".

It should be noted that the user profile label building module 312 extracts a user feature from the user behavior information D12' and analyzes the historical behavior (i.e., user behavior information D12') of the user operating the ERP system 210 in practice in various manufacturing scenarios to extract more user features. Therefore, the user profile label building module 312 may accurately describe the user behavior information D12' and accordingly obtain rich and detailed user label data. Therefore, the built interested user profile label architecture D22-2 may describe the features of various user behaviors and the corresponding needs more accurately.

After the user profile label architecture D22 is built, the user profile label building module 312 automatically and regularly maintains the user profile label architecture D22. To be specific, the user profile label building module 312 periodically accesses the user behavior information D12' and the user attribute information D13' (i.e., user information D12) in the ERP system 210 and re-executes the modules S421 to S422 and S431 to S432 according to the accessed user information D12. Therefore, by updating the basic user profile label architecture D22-1 and the interested user profile label architecture D22-2 (i.e., the user profile label building module D22) according to the latest user information D12 through the user profile label building module 312, adaptation to the ever-changing manufacturing scenarios may be achieved. The user profile label building module 312 may continuously improve the user profile label architecture D22 through user feedback and data analysis, so as to adapt to changes and needs of the user.

In this embodiment, the label architecture building system 300 integrates the built task profile label architecture D21, basic user profile label architecture D22-1, and interested user profile label architecture D22-2 into a single label architecture D2 through the processor. Accordingly, the recommendation system accesses the label architecture D2 to provide the corresponding recommendation information.

In view of the foregoing, in the label architecture building system and the label architecture building method provided by the disclosure, data extraction is performed on the task information and the user information in a manufacturing management system (e.g., an ERP system), so as to obtain rich task label data and user label data through operations such as log mining, statistical analysis, and association analysis. Accordingly, the label architecture building system may build a complete label architecture (i.e., task profile label architecture and user profile label architecture), so as to meet the changing needs of the manufacturing industry and enable the recommendation system to provide accurate recommendation information by applying the built label architecture.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A label architecture building system, configured to connect to an electronic device, wherein the electronic device is coupled to an enterprise system and a recommendation system, and access the enterprise system to obtain data of task and user information and data of user information, wherein the label architecture building system comprise:

a storage device coupled to the enterprise system and the recommendation system and configured to store a plurality of modules; and a processor coupled to the storage device and configured to execute the plurality of modules, wherein the plurality of modules comprise a task profile label building module and a user profile label building module, wherein the task profile label building module is a first machine learning model respectively comprising a first classification model and an association analysis model, and the user profile label building module is a second machine learning model comprising a second classification model, wherein the processor is configured to input the data of task and user information into the task profile label building module to perform data mining to generate task label data and builds a task profile label architecture according to the task label data by the first classification model and the association analysis model, wherein the processor is configured to input the data of user information into the user profile label building module to perform data mining to generate user label data and builds a user profile label architecture according to the user label data by the second classification model, wherein the task profile label architecture is stored into a first database, and the user profile label architecture is stored into a second database, the first database and the second database are configured for access by the recommendation system, when the electronic device provides data of input information, the recommendation system generates recommendation information to the electronic device according to input information, the task profile label architecture, and the user profile label architecture, wherein the task and user information comprises task information and user behavior information, and the task label data comprises first task feature data and second task feature data, wherein the task profile label building module performs data extraction according to the task information to perform log mining to generate the first task feature data associated with a plurality of first features of the task information by applying unsupervised learning and calculation of natural language processing, wherein the task profile label building module analyzes the task information according to the user behavior information to generate the second task feature data associated with a plurality of second features of the task information, wherein the user behavior information includes a task logfile, wherein the second task feature data includes an operating frequency with a task type and equipment requirements with process requirements, wherein the task profile label building module classifies the first task feature data and the second task feature data into a plurality of different categories, subdivides each classified category into a plurality of different subcategories, and accordingly builds these category data into a label architecture to be outputted as the task profile label architecture.

2. The label architecture building system according to claim 1, wherein the task profile label building module performs association analysis according to the first task feature data and the second task feature data to build the task profile label architecture.

3. The label architecture building system according to claim 1, wherein the task profile label building module periodically accesses the enterprise system to update the task profile label architecture according to the latest task and user information.

4. The label architecture building system according to claim 1, wherein the user information comprises user attribute information, and the user label data comprises first user feature data, wherein the user profile label building module performs data extraction according to the user attribute information to generate the first user feature data associated with a plurality of first features of the user attribute information.

5. The label architecture building system according to claim 4, wherein the user label data further comprises second user feature data, wherein the user profile label building module analyzes the first user feature data to generate the second user feature data associated with a plurality of second features of the user attribute information and builds a basic user profile label architecture in the user profile label architecture according to the first user feature data and the second user feature data.

6. The label architecture building system according to claim 1, wherein the user information comprises the user behavior information, and the user label data comprises third user feature data, wherein the user profile label building module performs data extraction according to the user behavior information to generate the third user feature data associated with a plurality of first features of the user behavior information.

7. The label architecture building system according to claim 6, wherein the user label data further comprises fourth user feature data, wherein the user profile label building module analyzes the user behavior information to generate the fourth user feature data associated with a plurality of second features of the user behavior information and builds an interested user profile label architecture in the user profile label architecture according to the third user feature data and the fourth user feature data.

8. The label architecture building system according to claim 1, wherein the user profile label building module periodically accesses the enterprise system to update the user profile label architecture according to the latest user information.

9. A label architecture building method, adapted to a label architecture building system, the label architecture building system is configured to connect to an electronic device, wherein the electronic device is coupled to an enterprise system and a recommendation system, and access the enterprise system to obtain data of task and user information and data of user information, the label architecture building system comprises a processor and a storage device, the label architecture building method comprises:

storing, through the storage device, a plurality of modules, wherein the storage device is coupled to the enterprise system and the recommendation system; and executing, through the processor, the plurality of modules, wherein the plurality of modules comprise a task profile label building module and a user profile label building module, wherein the task profile label building module is a first machine learning model respectively comprising a first classification model and an association analysis model, and the user profile label building module is a second machine learning model comprising a second classification model, wherein the step of executing the plurality of modules comprises:

performing, through the processor inputs the data of task and user information into the task profile label building module, data mining to generate task label data;

building, through the task profile label building module, a task profile label architecture according to the task label data by the first classification model and the association analysis model;

performing, through the processor inputs the data of user information into the user profile label building module, data mining to generate user label data; and building, through the user profile label building module, a user profile label architecture according to the user label data by the second classification model, wherein the task profile label architecture is stored into a first database, and the user profile label architecture is stored into a second database, the first database and the second database are configured for access by the recommendation system, when the electronic device provides data of input information, the recommendation system generates recommendation information to the electronic device according to input information, the task profile label architecture, and the user profile label architecture, wherein the task and user information comprises task information and user behavior information, and the task label data comprises a first task feature data and second task feature data, wherein the step of performing data mining according to the task and user information in the enterprise system to generate task label data comprises:

performing, through the task profile label building module, data extraction according to the task information to perform log mining to generate the first task feature data associated with a plurality of first features of the task information by applying unsupervised learning and calculation of natural language processing, wherein the step of performing data mining according to the task and user information in the enterprise system to generate task label data comprises:

analyzing, through the task profile label building module, the task information according to the user behavior information to generate the second task feature data associated with a plurality of second features of the task information, wherein the user behavior information includes a task logfile, wherein the second task feature data includes an operating frequency with a task type and equipment requirements with process requirements, wherein the task profile label building module classifies the first task feature data and the second task feature data into a plurality of different categories, subdivides each classified category into a plurality of different subcategories, and accordingly builds these category data into a label architecture to be outputted as the task profile label architecture.

10. The label architecture building method according to claim 9, wherein the step of building the task profile label architecture according to the task label data comprises:

performing, through the task profile label building module, association analysis according to the first task feature data and the second task feature data to build the task profile label architecture.

11. The label architecture building method according to claim 9, further comprising:

periodically accessing, through the task profile label building module, the enterprise system to update the task profile label architecture according to the latest task and user information.

12. The label architecture building method according to claim 9, wherein the user information comprises user attribute information, and the user label data comprises first user feature data, wherein the step of performing data mining according to the user information in the enterprise system to generate the user label data comprises:

performing, through the user profile label building module, data extraction according to the user attribute information to generate the first user feature data associated with a plurality of first features of the user attribute information.

13. The label architecture building method according to claim 12, wherein the user label data further comprises second user feature data, wherein the step of performing data mining according to the user information in the enterprise system to generate the user label data comprises:

analyzing, through the user profile label building module, the first user feature data to generate the second user feature data associated with a plurality of second features of the user attribute information, the step of building the user profile label architecture according to the user label data comprises:

building, through the user profile label building module, a basic user profile label architecture in the user profile label architecture according to the first user feature data and the second user feature data.

14. The label architecture building method according to claim 9, wherein the user information comprises the user behavior information, and the user label data comprises third user feature data, wherein the step of performing data mining according to the user information in the enterprise system to generate the user label data comprises:

performing, through the user profile label building module, data extraction according to the user behavior information to generate the third user feature data associated with a plurality of first features of the user behavior information.

15. The label architecture building method according to claim 14, wherein the user label data further comprises fourth user feature data, wherein the step of performing data mining according to the user information in the enterprise system to generate the user label data comprises:

analyzing, through the user profile label building module, the user behavior information to generate the fourth user feature data associated with a plurality of second features of the user behavior information, the step of building the user profile label architecture according to the user label data comprises:

building, through the user profile label building module, an interested user profile label architecture in the user profile label architecture according to the third user feature data and the fourth user feature data.

16. The label architecture building method according to claim 9, further comprising:

periodically accessing, through the user profile label building module, the enterprise system to update the user profile label architecture according to the latest user information.

* * * * *